United States Patent Office 3,748,354
Patented July 24, 1973

---

3,748,354
SPIRO[3,3]HEPTANE AMINO ACIDS
Larry J. Loeffler, Bethesda, Md., assignor to Merck & Co., Inc., Rahway, N.J.
No Drawing. Original application Apr. 1, 1970, Ser. No. 24,885, now Patent No. 3,666,790. Divided and this application June 16, 1971, Ser. No. 153,859
Int. Cl. C07c *101/04, 101/14, 101/18*
U.S. Cl. 260—514 G  3 Claims

ABSTRACT OF THE DISCLOSURE

Novel spiro[3.3]heptane amino acids and their derivatives are disclosed and their method of preparation is described.

---

This application is a division of U.S. Ser. No. 24,885, filed Apr. 1, 1970, now Pat. No. 3,666,790.

This invention relates to new spiro amino acid compounds and their derivatives. This invention further relates to a method of preparing new spiro amino acid compounds and their derivatives. This invention further relates to compounds which are useful in preparing polyesters and polyamides.

More specifically this invention describes those compounds of the general formula:

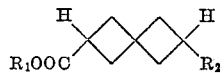

where:

$R_1$ is hydrogen or alkyl (preferably lower alkyl from about 1–5 carbon atoms); and
$R_2$ is —COOR; —CONH$_2$; —CN; —CH$_2$NH$_2$;
—NHCOOR; or —NH$_2$ where R is alkyl (preferably lower alkyl from about 1–5 carbon atoms), with the proviso that $R_1$ is not alkyl when $R_2$ is —COOR.

Included within the scope of this invention are the hydrates and the salts of the amine and the carboxylic acid groups of the compounds of the above formula. The hydrates and salts do not differ from the compounds themselves but rather provide a convenient solubility factor. Such salts would include the inorganic and organic acid addition salts of the amines such as those prepared from hydrochloric acid, sulfuric acid, phosphoric acid, methane-sulfonic acid, propionic acid, etc. Also included are the alkali; alkaline earth or aluminum metal salts of the carboxylic acid.

The more preferred compounds of this invention are those described by the formula:

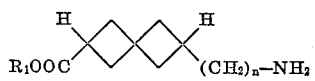

where $n$ is 0 or 1 and $R_1$ is described above.

The most preferred compounds of this invention are 6-aminospiro[3.3]heptane-2-carboxylic acid and 6-aminomethylspiro[3.3]heptane-2-carboxylic acid.

Polycarboxamides are well known in the art and have received widespread use due to the excellent chemical and physical properties they exhibit as nylons.

Demand for new polymers continues to increase, and amino acid compounds which will form polycarboxamide polymers with different chemical and physical properties are continually sought after.

The amino acid products prepared in accordance with the present invention can be easily converted to polyamides by methods known in the art. Such polyamide synthesis is disclosed in such as U.S. Pats. Nos. 2,071,250; 2,071,253; 2,252,555; 2,768,994; 2,130,523; 2,252,557; 3,027,352; 2,130,948; 2,374,137; 3,028,365; 2,190,770; 2,385,890. Polyamides are particularly useful for modifying the properties of other polyamides by the replacement of a portion of a polymer molecule with a portion of a different polyamide such as replacement of a portion of an acid of the U.S. Pat. No. 3,081,334 with one or more of the acids which can be prepared by the present invention.

The compounds of the present invention may also be useful as plasticizers for natural and synthetic resins and can be converted into pharmaceutical products.

The compounds of the present invention may be prepared by the following processes.

Spiro[3.3]heptane - 2,6 - dicarboxylic acid may be diesterified under normal conditions (preferably diazomethane). The resulting alkyl spiro[3.3]heptane-2,6-dicarboxylate (VIII) is then hydrolyzed with one equivalent of alkali to afford the alkyl hydrogen spiro[3.3]heptane-2,6-dicarboxylate (VII). Successive treatment of the alkyl hydrogen spiro[3.3]heptane-2,6-dicarboxylate (VII) with triethylamine, ethyl chlorocarbonte at 10° and anhydrous ammonia results in alkyl 6-carbamoyl spiro[3.3]heptane-2-carboxylate (VI).

Treatment of alkyl 6-carbamyl spiro[3.3]heptane-2-carboxylate (VI) with bromine and sodium alkoxide in alcohol gives the urethane derivative (V) which on acid hydrolysis yields 6-aminospiro[3.3]heptane-2-carboxylic acid (IV).

Dehydration of alkyl 6-carbamoyl spiro[3.3]heptane-2-carboxylate with phosphorus oxychloride in ethylene dichloride results in alkyl 6-cyano spiro[3.3]heptane-2-carboxylate (III). This is then saponified with an excess of alkali, followed by acidification to give 6-cyanospiro[3.3]heptane-2-carboxylic acid (II) which can then be catalytically reduced to the desired 6-aminomethylspiro[3.3]heptane-2-carboxylic acid (I).

The following structural formulas illustrate the preparation of the compounds of this invention:

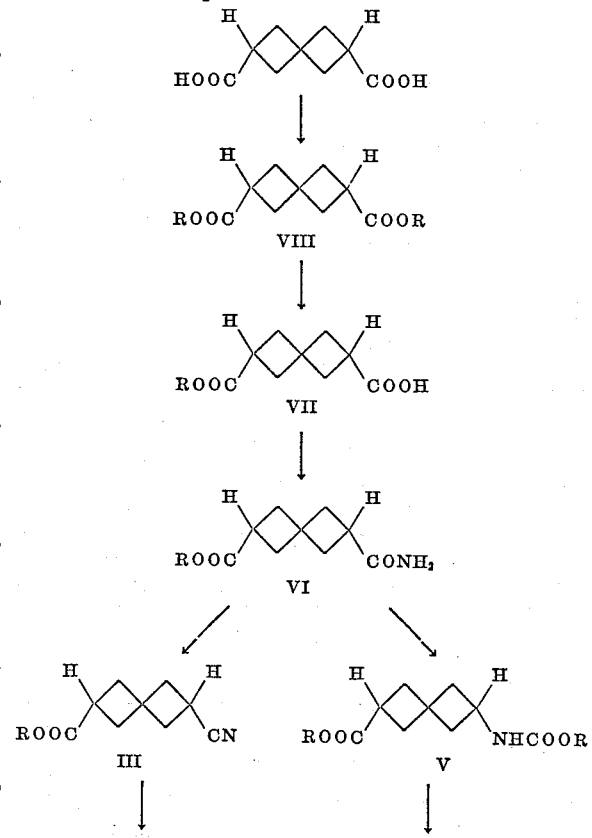

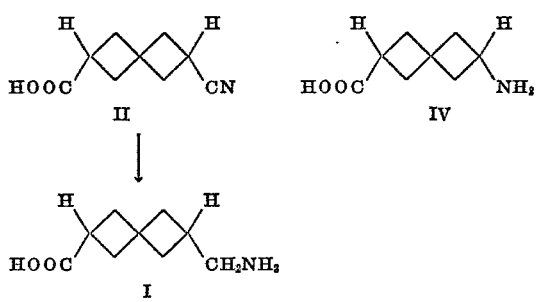

where R is alkyl.

The preparation of dimethyl spiro[3.3]heptane-2,6-dicarboxylate may be found in J. Org. Chem.: 26, 54 (1961).

The following examples illustrate this invention and are not intended to be a limitation of it.

EXAMPLE 1

6-aminomethylspiro[3.3]heptane-2-carboxylic acid (A) Dimethyl spiro[3.3]heptane - 2,6 - dicarboxylate: 5.00 g. (27.2 mmoles) of spiro[3.3]heptane - 2,6 - dicarboxylic acid is dissolved in 200 ml. of absolute ether. To this, at 5–10° C. and over a 5 minute period is added a solution of diazomethane in ether (120 ml. of solution containing 0.50 mg./ml.). After addition, the reaction mixture is stirred for 1 hour in an ice bath and then 1 ml. of acetic acid is added to destroy the excess diazomethane. The reaction mixture is stirred for 10 minutes, then extracted three times wtih 25 ml. portions of sodium bicarbonate solution and dried over magnesium sulfate. The ether solution is then evaporated to dryness to obtain dimethyl spiro[3.3]heptane-2,6-dicarboxylate.

(B) Methyl hydrogen spiro[3.3]heptane-2,6-dicarboxylate: 4.67 g. (22.0 mmoles) of dimethyl ester from step A is added to a cooled solution of sodium hydroxide [0.51 g. (22.0 mmoles) sodium spheres dissolved in 25 ml. of methanol], followed by cautious addition of 1.25 ml. water under a nitrogen atmosphere]. The reaction is then refluxed for 18 hours and then evaporated to dryness in vacuo at 30–40° C. Water (25 ml.) is added and the mixture extracted three times with 20 ml. portions of ether. The water layer is cooled, acidified with 5 ml. of 6 N HCl and the oil which separates is extracted four times with 25 ml. portions of chloroform. The chloroform is then washed with water, dried over magnesium sulfate and evaporated to dryness. The resulting material is chromatographed on silica gel using chloroform as an eluant and the product thereby eluted is recrystallized from hexane to obtain methyl hydrogen spiro[3.3]heptane-2,6-dicarboxylate (M.P. 53–55° C.).

(C) Methyl 6-carbamoylspiro[3.3]heptane-2-carboxylate: 1.58 g. (8.0 mmoles) of monoacid from step B is dissolved in 25 ml. of dry chloroform. This is then cooled in an ice-salt bath to −10° C. and to this is added 0.81 g. (8.0 mmoles) of triethylamine dissolved in 10 ml. of chloroform and followed by 0.87 g. (8.0 mmoles) of ethyl chloroformate dissolved in 10 ml. of chloroform over a 5 minute period, keeping the temperature below −5° C. The reaction mixture is then stirred for 15 minutes at −5° C. With continued cooling ammonia gas is bubbled into the reaction mixture for 10 minutes. The reaction mixture is then allowed to warm to room temperature and stirred for 20 hours. The suspension is shaken with 20 ml. of cold water and the chloroform layer is extracted three times with 10 ml. portions of 0.1 N hydrochloric acid, three times with 10 ml. portions of saturated sodium bicarbonate solution and three times with 10 ml. portions of water. The chloroform is then dried over magnesium sulfate and evaporated to dryness in vacuo at 40° C., resulting in a solid which is recrystallized from benzene to obtain methyl 6-carbamoyl spiro[3.3]heptane - 2 - carboxylate (M.P. 148.5–150° C.).

(D) Methyl 6-cyanospiro[3.3]heptane-2-carboxylate: 0.78 g. (395 mmoles) of the amide-ester from step C is dissolved in 20 ml. of warm 1,2-dichloroethane and 1.70 ml. of phosphorus oxychloride is added and the mixture refluxed for 20 minutes. Most of the phosphorus oxychloride is then distilled off at 15 mm./90–100° C. and the reaction residue poured into 20 ml. of ice cold saturated sodium bicarbonate. The oil that separates is extracted four times with 20 ml. portions of n-pentane and the combined extracts are then washed with sodium bicarbonate solution and dried over magnesium sulfate. The pentane solution is then evaporated to dryness to obtain methyl 6-cyanospiro[3.3]heptane-2-carboxylate.

(E) 6-cyanospiro[3.3]heptane-2-carboxylic acid: 410 mg. (2.29 mmoles) of the nitrile-ester from step D is dissolved in 10 ml. of ethanol and 1.38 ml. of 2 N sodium hydroxide (20% excess) solution is added. The reaction mixture is refluxed for two hours, then allowed to stir at room temperature for 15 hours. The reaction mixture is then evaporated to dryness, the residue treated with water and extracted with ether. The aqueous layer is then acidified with 1 ml. of 6 N hydrochloric acid and the oil that separates is extracted five times with ether. The ether is dried over magnesium sulfate and evaporated to dryness to obtain 6-cyanospiro[3.3]heptane-2-carboxylic acid (M.P. 98–101° C.).

(F) 6-aminomethylspiro[3.3]heptane - 2 - carboxylic acid: 250 mg. (1.51 mmoles) of the nitrile-acid from step E is dissolved in 20 ml. of absolute ethanol. To this is added 0.50 ml. of 6 N HCl and 100 mg. of platinum oxide. The mixture is then hydrogenated at 30 lbs./in.² and room temperature for 1 hour, after which the catalyst is removed by filtration and the filtrate allowed to evaporate to dryness. The residue is then treated wtih 10 ml. of 3 N HCl and refluxed for 6 hours and then evaporated to dryness and to obtain 6-aminomethyl-spiro[3.3]heptane-2-carboxylic acid hydrochloride (M.P. 154–158° C.). This hydrochloride salt is then dissolved in 1 ml. of water and passed through a column of 20 g. (wet weight) of Dowex-1 acetate to obtain the freebase, 6-aminomethylspiro[3.3]heptane - 2 - carboxylic acid (M.P. 255–260° C.).

EXAMPLE 2

6-aminospiro[3.3]heptane-2-carboxylic acid (A) Methyl 6-(N-carbomethoxyamino)-spiro[3.3]heptane-2-carboxylate: 0.99 g. (5.0 mmoles) of methyl 6-carbamoylspiro[3.3]heptane-2-carboxylate from Example 1(C) is added to a solution of sodium methoxide [prepared from 0.25 g. (11.0 mmoles) of sodium in 25 ml. of absolute methanol]. The solution is stirred under nitrogen at 0° C. and 0.9 g. (6.0 mmoles) of bromine is added over a 10 minute period. The reaction mixture is then refluxed on a steam bath for 15 minutes, cooled and added to 150 ml. of water. This mixture is extracted three times with 50 ml. portions of ether and the combined extracts are dried over magnesium sulfate and evaporated to dryness to obtain methyl 6-(N-carbomethoxyamino)-spiro-[3.3]heptane-2-carboxylate.

(B) 6-aminospiro[3.3]heptane-2-carboxylic acid: A mixture of 0.89 g. (3.92 mmoles) of urethane from step A and 3.0 ml. of conc. hydrochloric acid is refluxed for 8 hours. The reaction mixture is then filtered through a sintered glass funnel and evaporated to dryness at 60–70° C. in vacuo. To the residue is added 10 ml. of water and the mixture is reevaporated to dryness. This is repeated three more times to obtain 6-aminospiro[3.3]heptane-2-carboxylic acid hydrochloride. This is then dissolved in 2 ml. of water and passed through a column of 30 g. (wet weight) of Dowex 1-acetone to obtain 6-aminospiro[3.3]heptane-2-carboxylic acid hydrate (M.P. 233–236° C.) which is then dried over $P_2O_5$ and paraffin at 100° C./10 mm. for 15 hours to obtain 6-aminospiro-[3.3]heptane-2-carboxylic acid (M.P. 218–220° C.).

What is claimed is:
1. A compound of the formula:

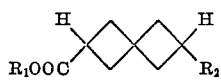

where:
$R_1$ is hydrogen or lower alkyl; and
$R_2$ is —$CH_2NH_2$ or —$NH_2$;
and its salts and hydrates.

2. A compound according to claim 1 where $R_1$ is hydrogen and $R_2$ is —$NH_2$ thus forming 6-aminospiro[3.3]heptane-2-carboxylic acid.

3. A compound according to claim 1 where $R_1$ is hydrogen and $R_2$ is —$CH_2NH_2$ thus forming 6-aminomethylspiro[3.3]heptane-2-carboxylic acid.

References Cited

Liotta et al.: Chem. Commun. p. 1251, 1969.

LORRAINE A. WEINBERGER, Primary Examiner

R. GERSTL, Assistant Examiner

U.S. Cl. X.R.

260—468 G, 448 R